(12) United States Patent
Nakai

(10) Patent No.: US 7,965,903 B2
(45) Date of Patent: Jun. 21, 2011

(54) IMAGE PROCESSING APPARATUS

(75) Inventor: Yoshiyuki Nakai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1091 days.

(21) Appl. No.: 11/789,773

(22) Filed: Apr. 25, 2007

(65) Prior Publication Data
US 2007/0253007 A1 Nov. 1, 2007

(30) Foreign Application Priority Data

Apr. 28, 2006 (JP) ................................ 2006-125264
Apr. 28, 2006 (JP) ................................ 2006-125273

(51) Int. Cl.
*G06K 9/36* (2006.01)
*G06F 3/12* (2006.01)
(52) U.S. Cl. ........................................ 382/284; 358/1.2
(58) Field of Classification Search .................. 382/100, 382/284, 312; 358/1.2, 3.28, 1.12, 1.14, 358/1.15
See application file for complete search history.

(56) References Cited

U.S. PATENT DOCUMENTS

| 5,798,844 A * | 8/1998 | Sakano et al. ................. 358/405 |
| 7,027,189 B2 * | 4/2006 | Umeda ........................ 358/3.03 |
| 7,509,060 B2 * | 3/2009 | Yaguchi et al. ................. 399/15 |
| 7,637,170 B2 * | 12/2009 | Foster et al. ............... 73/861.22 |
| 2004/0184065 A1 * | 9/2004 | Guan et al. ................... 358/1.14 |

FOREIGN PATENT DOCUMENTS

JP 09-305075 11/1997

* cited by examiner

*Primary Examiner* — Yon Couso
(74) *Attorney, Agent, or Firm* — David G. Conlin; Steven M. Jensen; Edwards Angell Palmer & Dodge LLP

(57) ABSTRACT

An image processing apparatus forming an image of image data on a recording medium, is characterized by, when forming the image by synthesizing the image data with specific information including an image different from the image data, varying the number of pieces of the specific information according to a size of a specific information imparting region to which the specific information is imparted. Thereby, when the specific information imparting region is small, such as in the case of a postcard and a name card, it is possible to surely detect the specific information by increasing the number of pieces of the specific information. Further, when reading an image, the image processing apparatus varies, on the basis of a detected number of pieces of the specific information, a threshold value for determining whether or not the specific information is adopted, according to a size of the recording medium. Thereby, even when the size of the recording medium is small and therefore the number of pieces of the specific information is small, the detected number of pieces of the specific information is made to exceed the threshold value by setting the threshold value to a low value, so as to enable the specific information to be recognized.

8 Claims, 13 Drawing Sheets

| PAPER SHEET TYPE | PAPER SHEET SIZE (mm) | AREA (mm$^2$) | NUMBER OF PIECES OF SPECIFIC INFORMATION |
|---|---|---|---|
| A1 | 841*594 | 499554 | N4 |
| A2 | 594*420 | 249480 | N4 |
| A3 | 420*297 | 124740 | N4 |
| A4 | 297*210 | 62370 | N3 |
| A5 | 210*148 | 31080 | N3 |
| A6 | 148*105 | 15540 | N2 |
| A7 | 105*74 | 7770 | N2 |
| B1 | 1030*728 | 749840 | N4 |
| B2 | 728*515 | 374920 | N4 |
| B3 | 515*364 | 187460 | N4 |
| B4 | 364*257 | 93548 | N4 |
| B5 | 257*182 | 46774 | N3 |
| B6 | 182*128 | 23296 | N3 |
| B7 | 128*91 | 11648 | N2 |
| POST CARD | 148*100 | 14800 | N2 |
| PHOTOGRAPH (E-SIZE) | 117*83 | 9711 | N2 |
| NAME CARD | 91*55 | 5005 | N1 |

FIG. 5

| AREA (mm2) | NUMBER OF PIECE OF SPECIFIC INFORMATION |
|---|---|
| LESS THAN 6000 | N1 |
| NOT LESS THAN 6000 AND LESS THAN 16000 | N2 |
| NOT LESS THAN 16000 AND LESS THAN 66000 | N3 |
| NOT LESS THAN 66000 | N4 |

FIG. 13

| PAPER SHEET SIZE | SENSOR INPUT |
|---|---|
| A5 | A, B,      W |
| A5R | A,          W, X |
| A4 | A, B, C,   W, X, |
| A4R | A, B,       W, X, Y, |
| A3 | A, B, C    W, X, Y, Z |

# IMAGE PROCESSING APPARATUS

BACKGROUND OF THE INVENTION

1. Field of the Invention

The present invention relates to an image processing apparatus capable of synthesizing image data with specific information of copy inhibition, copy guard and the like, which is different from the image data, and of performing processing corresponding to the read specific information.

2. Description of the Related Art

In image information inputted into an image processing apparatus, specific information, such as copy inhibition information and copy guard information, is embedded apart from image data in order to prevent illegal processing of a document. When detecting that the specific information is included in the inputted image information, the image processing apparatus performs predetermined processing corresponding to the specific information.

On the other hand, when reading a document in a state where dust or foreign matters are stuck to the document, the image processing apparatus may not be able to detect the embedded specific information. In order to prevent misdiscrimination of the specific information, the image processing apparatus is constituted so as to perform processing included in the specific information, when detecting a plurality of (five to six) pieces of the specific information in inputting image information, such as in reading the document.

In Japanese Patent Laid-Open No. 2001-94771, there is disclosed an image processing apparatus capable of inhibiting illegal copy of image data in such a manner that feature quantity data of the image data are compared with feature quantity data of a specific image, such as paper money or securities stored beforehand in a ROM, that a threshold value for a matching rate between the feature quantity data of the image data and the feature quantity data of the specific image is set for each kind of the image data, and that, when the matching rate is not smaller than the threshold value, image formation of the image data is not performed.

However, there are problems that when the number of pieces of the specific information is excessively increased, the influence of the specific information on the image becomes too large, and that when the number of pieces of specific information is too small, it is not possible to surely detect the specific information and to perform predetermined processing. These problems are caused because the specific information is incorporated at a predetermined interval regardless of the size of a document when the specific information is incorporated in the document. Therefore, in a small-sized document such as a postcard and a name card, the number of pieces of information detected as the specific information is reduced, which may result in a problem that the specific information cannot be surely recognized.

FIGS. 2(A) to 2(D) show examples of separable recording papers. FIG. 3 shows examples in which a number of pieces of specific information such as characters and symbols are arranged on a paper sheet 43. FIG. 3(A) shows an example in which a plurality of pieces of specific information 44 are sequentially arranged on an A4 size paper sheet, and FIG. 3(B) shows an example in which the plurality of pieces of specific information 44 are randomly arranged on the A4 size paper sheet. FIG. 3(C) shows a case where the paper sheet of FIG. 3(A) is divided into a plurality of label papers, and FIG. 3(D) shows a case where the paper sheet of FIG. 3(B) is divided into a plurality of label papers. When the A4 size paper sheet 43 is divided into a plurality of label papers 41, as shown in FIGS. 3(C) and 3(D), there is a case where the specific information 44a strides over a boundary 45 (section line) between the label papers 41 and thereby is interrupted in its midway.

In this case, the interrupted information 44a is not recognized as the specific information by a detecting section of the image processing apparatus, resulting in a problem that the number of detected pieces of the specific information is reduced so as not to exceed the threshold value, and the processing corresponding to the specific information such as copy inhibition cannot be correctly performed.

In view of the above, it is an object of the present invention to provide an image processing apparatus capable of synthesizing specific information such as copy inhibition with image data of a document without providing a sense of incongruity to the document, and of surely performing processing corresponding to the specific information.

A further object of the present invention is to provide an image processing apparatus capable of surely performing the processing corresponding to the specific information such as copy inhibition by making the threshold value variable according to the size of a document.

SUMMARY OF THE INVENTION

In order to achieve the above described object, according to the present invention, there is provided an image processing apparatus performing image formation of image data on a recording medium, characterized in that when performing image formation by synthesizing the image data with specific information including images different from the image data, the image processing apparatus varies the number of pieces of the specific information according to a size of a specific information imparting region to which the specific information is imparted.

With the above described constitution, the number of pieces of the specific information is made variable according to the size of the specific information imparting region, whereby when the size of the specific information imparting region is small as in the case of a postcard, a name card and the like, it is possible to surely detect the specific information by increasing the number of pieces of the specific information.

The specific information imparting region is a region to which the specific information is imparted. The imparting region is defined according to a size up to the size of a recording medium such as a paper sheet. The imparting region may be the entire paper sheet, or may also be a partial region of the paper sheet.

When the size of the specific information imparting region is smaller than a predetermined size, the number of pieces of the specific information is increased or decreased according to the size of the specific information imparting region, while when the size of the specific information imparting region is not smaller than the predetermined size, the number of pieces of the specific information is made to remain unchanged. This is because when the size of the specific information imparting region is not smaller than the predetermined size, imparting the specific information too much may result in providing a sense of incongruity to a document in which an image is formed.

The increase or decrease in the number of pieces of the specific information can be effected by changing the arrangement density of the specific information. By changing the arrangement density, a plurality of pieces of the specific information can be formed even on a small recording medium, such as a postcard and a name card, having a small imparting region, and hence the specific information can be surely detected.

Further, the specific information may be imparted in such a manner that the number of pieces of the specific information is set beforehand according to the size of the imparting region, but apart from this, the security level may also be adjusted by varying the number of pieces of the specific information per unit area.

With the above described constitution, the number of pieces of the specific information is made variable so as to be individually set. The larger number of pieces of the specific information makes it easier to detect the specific information and hence raises the security level, while the smaller number of pieces of the specific information lowers the security level. Of course, the adjusting range of the security level can be set in such a manner that the number of pieces of specific information which enables the specific information to be surely detected is taken as a minimum number, and the number of pieces of specific information which does not provide a sense of incongruity to the document in which an image is formed is taken as a maximum number.

Here, the specific information means information, such as copy inhibition, copy guard, and transmission inhibition, which is different from original image data. The specific information constitutes a specific pattern in which specific characters, symbols, figures and the like are arranged in a linear or curved shape.

Further, the recording medium is a medium used for recording, transmission and storage of information, and includes an electromagnetic recording medium and an optical recording medium, in addition to a paper medium such as a paper sheet. The size of the recording medium is judged for example by its area. Further, the size of the recording medium is usually recognized from the size of a paper sheet read by a reading device such as a scanner. In the case of the electromagnetic recording medium or the optical recording medium, the size of the recording medium means a size corresponding to the size of one page.

The image information inputted into the image processing apparatus is usually information read by a scanner device, but is not limited to this, and may also be image information stored in a hard disk and image information received through a network. When the size of a recording medium is recognized from the image information stored in the hard disk, it is possible to obtain the information on the size of one page from the header information.

Further, the image processing apparatus according to the present invention is characterized in that when image data are processed together with the specific information including images different from the image data, a specific information number threshold value for determining whether or not the specific information is adopted, is varied according to the size of a specific information reading range.

With the above described constitution, the threshold value is changed according to the size of the specific information reading range at the time of reading an image. Thus, even when the size of the specific information reading range is small and thereby the number of pieces of the specific information is small, the number of detected pieces of the specific information is made to exceed the threshold value by setting the threshold value to a low value, so as to enable the specific information to be recognized. As a result, the processing according to the specific information such as copy inhibition can be correctly performed.

The specific information number threshold value is changed according to the size of the specific information reading range. The specific information reading range can be defined according to, for example, the size of a recording medium.

Further, in a special case, the specific information reading range is defined on the basis of shade information extracted from image information. For example, when image information of an envelope to which an address label paper is stuck is read by a scanner, in a part other than the part corresponding to the size of the envelope read by a document size sensor, a level difference is caused at the periphery of the stuck address label paper due to the thickness of the label paper, as a result of which shade is generated at the periphery of the label paper. The shade information is recognized as the reading range to which the specific information is imparted, and the threshold value is set so as to correspond to the reading range.

Then, the number of pieces of the specific information which is imparted to the reading range and defined by the shade information is compared with the threshold value. When the number of pieces of the specific information exceeds the threshold value, the processing according to the specific information is performed.

Further, the threshold value is set to be smaller as the size of the specific information reading range is smaller, while the threshold value is set to be larger as the size of the specific information reading range is larger.

Further, it is also possible that when the size of the specific information reading range is smaller than a predetermined size, the threshold value is changed according to the size of the specific information reading range, and that when the size of the specific information reading range is not smaller than the predetermined size, the threshold value is made to remain unchanged. This is to eliminate a sense of incongruity of a printed image, which is generated when the specific information is excessively increased.

Note that as a separable paper sheet like the address label paper, a tag paper or a name card can be exemplified. These paper sheets can be divided into a plurality of sheets, which are used by being stuck to the other documents (paper sheets).

As described above, according to the present invention, the number of pieces of specific information can be varied according to the size of a specific information imparting region, with the result that when the specific information imparting region, such as a postcard and a name card, is small, the specific information can be surely detected by increasing the number of pieces of the specific information, and that when the specific information imparting region is large, the number of pieces of the specific information is suppressed so as not to provide a sense of incongruity to a document.

Further, since the threshold value is changed according to the size of the specific information reading range, even when the size of the specific information reading range is small and thereby the number of pieces of the specific information is small, the number of detected pieces of the specific information is made to exceed the threshold value by setting the threshold value to a low value, so as to enable the specific information to be recognized. As a result, the processing according to the specific information, such as copy inhibition, can be correctly performed.

BRIEF DESCRIPTION OF THE DRAWINGS

FIG. 4 is a figure showing a relation between the size of a paper sheet and the number of pieces of specific information to be synthesized;

FIG. 5 is a figure showing a relation between the area of paper sheet and the number of pieces of specific information to be synthesized;

FIG. 13 is a figure showing a relation between the result inputted from the document detecting sensor and the size of paper sheet;

FIG. 15 is a flow chart showing image processing control at the time of reading the specific information of the envelope to which the address label paper is stuck, and the like.

DETAILED DESCRIPTION OF THE PREFERRED EMBODIMENTS

Figure 1:
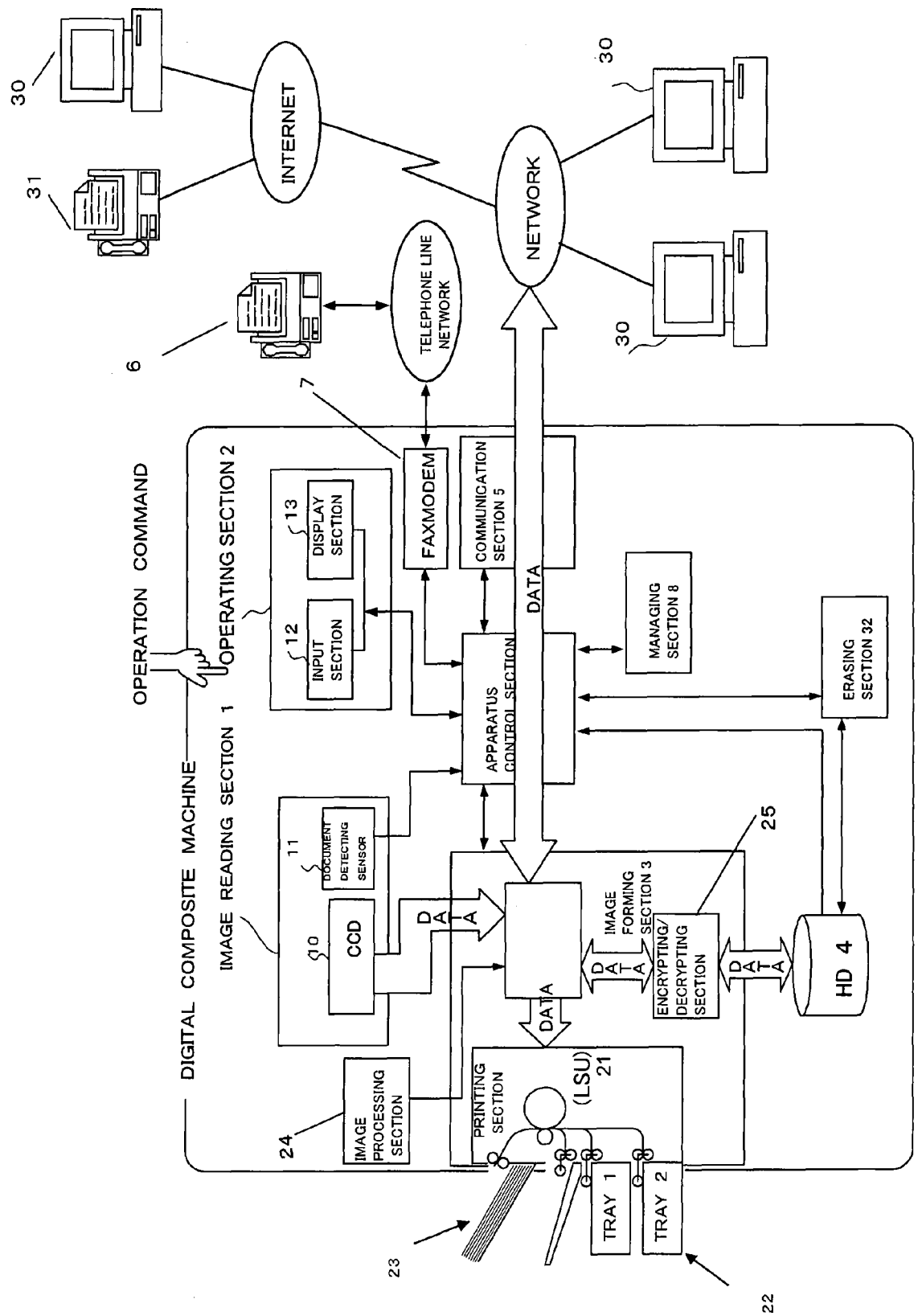
FIG. 1 schematically shows a constitution of an image processing apparatus according to the present invention.
Figure 2:
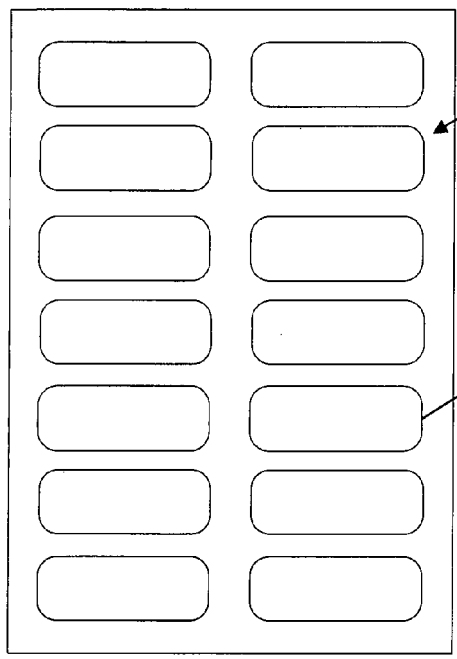
FIGS. 2(A) to 2(D) are figures showing examples of separable recording papers.
Figure 2:
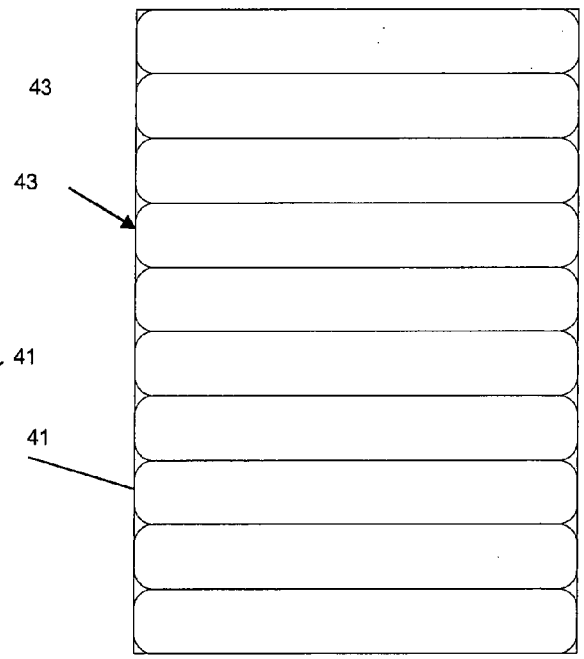
Figure 2:
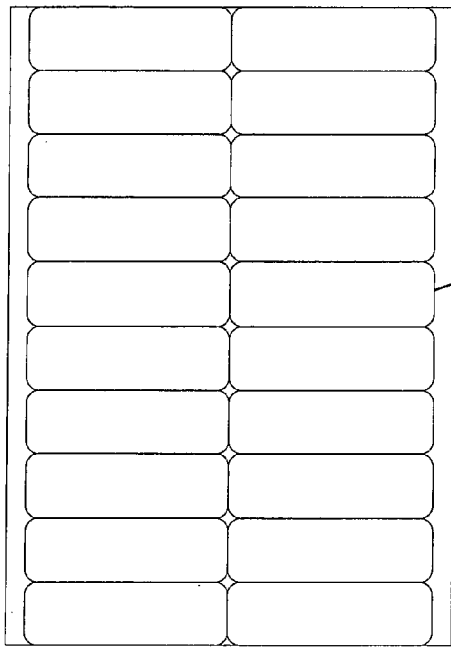
Figure 2:
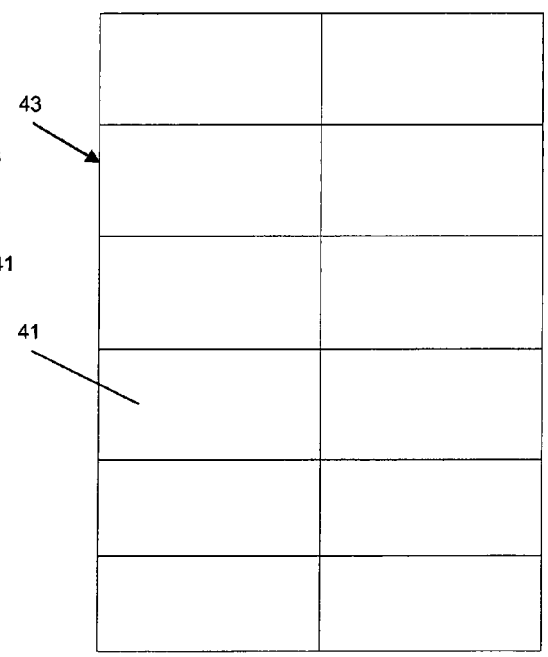

FIG. 1 shows an image processing apparatus according to the present embodiment. The image processing apparatus is a digital composite machine having a copy mode, a printer mode, a scanner mode, and a facsimile mode, and is provided with an image reading section 1 which reads a document and inputs image data, an operating section 2 which receives a user's input, an image forming section 3 which performs printing of the inputted image data, a hard disk device 4 which stores the image data, a communication section 5 which performs data communication with an external device, a FAX modem 7 which performs communication with a facsimile device 6, a managing section 8 which stores control information, setting information and the like of the entire apparatus, and an apparatus control section 9 which includes a CPU and performs overall control of the apparatus.

The image reading section 1 functions as an image input section which inputs an image, and has an image-pickup element such as a CCD 10 and a document detecting sensor 11 which detects a document set on a document table and an automatic document feeder (ADF). Image data of the image read by the CCD 10 are outputted to the image forming section 3.

The operating section 2 is provided with an operation panel, and has an input section 12 consisting of various input keys and display sections 13 such as a liquid crystal display. Here, operations of the entire apparatus and inputs of various settings are performed, and the input contents and operating state of the entire apparatus are displayed. The display section 13 is constituted as a touch panel and also functions as an input section.

The image forming section 3 includes a local memory 20 storing the inputted image data, a printing section 21 having a laser scanning unit, paper feed section 22 provided with a manual feed tray and a cassette tray, a paper discharge section 23 provided with a paper discharge tray, an image processing section 24, and an encrypting/decrypting section 25.

A readable/writable semiconductor memory such as SDRAM and flash memory is used for the local memory 20. The local memory 20 is divided into a region for storing the inputted image data and a region for storing image data to be outputted. Note that instead of dividing and using one local memory 20, two local memories 20 may also be used for input and output, respectively.

The inputted image data are stored in the local memory 20. The local memory 20 stores image data by overwriting new image data onto former image data. The image data are subjected to image processing such as compression, extension and working by the image processing section 24, and stored in the local memory 20. The image data subjected to the image processing are outputted to the printing section 21, the hard disk device 4, or the apparatus control section 9. The printing section 21 prints an image on a recording sheet supplied from the paper feed section 22 on the basis of the image data stored in the local memory 20.

The communication section 5 is connected to a router, a switching hub and the like via a LAN cable, and connected to a network formed by information processing apparatuses 30 such as personal computers and servers. The network is connected to the Internet via a telephone line network and a communication line such as an optical fiber. The communication section 5 performs transmission and reception of data to and from the information processing apparatuses 30 in the network, and performs transmission and reception of data and e-mails to and from an external information processing apparatus 30 and a facsimile device 31 via the Internet. The FAX modem 7 is connected to a telephone line network via a telephone line, and performs facsimile communication with the external facsimile device 6.

Upon receiving an input from the operating section 2 and a data input from an external device, the apparatus control section 9 performs control of each section on the basis of the information stored in the managing section 8, and performs processing of inputted image data. That is, the apparatus control section 9 performs processing based on one of the copy mode, printer mode, scanner mode and facsimile mode to the inputted image data, and outputs the inputted image data in a desired form.

The hard disk device 4 temporarily stores the image data. The encrypting/decrypting section 25 performs encrypting processing or decrypting processing to the image data. When the image data are stored in the hard disk device 4, the image data are encrypted by the encrypting/decrypting section 25. When the encrypted image data are read from the hard disk device 4, the image data are decrypted.

Further, the hard disk device 4 stores management information relating to the processing of data other than the image data. The management information includes filing management information, transmission destination management information, and history management information. The filing management information is a list of files in which the inputted image data are stored. The transmission destination management information is a list of transmission destinations in facsimile communication. The history management information is a list of executed processing contents.

Further, the hard disk device 4 is provided with an erasing section 32 which erases the image data in the hard disk device 4. The image data to be erased are data stored in a processing work area. The apparatus control section 9 processes and outputs the image data and thereafter controls the operation of the erasing section 32. The erasing section 32 makes it impossible to read the stored image data by overwriting random data and meaningless data onto the image data or erasing the image data, and invalidates the image data so that the image data cannot be reproduced. Note that the erasing section 32 may also be constituted so as to invalidate image data in the local memory 20 by erasing former image data by the overwriting operation or by erasing the image data. Note that the management information stored in the hard disk device 4 is not erased without a command from the apparatus control section 9.

Next, the operation when each mode is performed is explained. First, in the copy mode, image data of a document read by the image reading section 1 are outputted as a copy from the image forming section 3. Specifically, the image of the document set to a reading position is read by the CCD 10. The image data outputted from the CCD 10 is subjected to image processing on the local memory 20 by the image processing section 24, so as to be completed as an output image. The output image is once transferred from the local memory 20 to the hard disk device 4, so as to be stored there. In the case where there are a plurality of documents, these reading and storing operations are repeated.

Subsequently, on the basis of processing contents instructed from the operating section 2, the image data stored in the hard disk device 4 are successively read at proper timings, and sent to the local memory 20. Then, according to the timing of writing to the printing section 21, the image data are transmitted from the local memory 20 to the printing section 21, so that an image is printed on a sheet material supplied from the paper feed section 22, and the sheet material is discharged by the paper discharge section 23.

Also, in the case where the read image data are printed on a plurality of sheets, the image data are stored in the unit of pages as output images in the hard disk device 4, and sent from the hard disk device 4 to the local memory 20 according to the output mode. The transfer of the image data of the local memory 20 to the printing section 21 is repeated by the number of times corresponding to the number of output sheets, according to the timing of writing to the printing section 21.

In the printer mode, the image data outputted from the information processing apparatus 30 is subjected to output processing. That is, the image data from the information processing apparatus 30 are received by the communication section 5. The apparatus control section 9 sends the inputted image data to the local memory 20 to make the data extended as image data to be outputted in the unit of pages, and once stores the extended image data in the hard disk device 4. Then, the image data are sent from the hard disk device 4 to the local memory 20, and transmitted to the printing section 21 similarly to the case in the copy mode, so that the image is printed on a sheet material.

In the scanner mode, image data of a document read in the image reading section 1 are communicated to an arbitrary information processing apparatus 30 through the network. That is, the image data outputted from the CCD 10 are subjected to image processing on the local memory 20 so as to be completed as an output image, and are once stored in the hard disk device 4. At the time of transmission, the image data are sent from the hard disk device 4 to the local memory 20, and the apparatus control section 9 establishes communication with a transmission destination in the network, which is instructed via the operating section 2. Thereby, the image data are transmitted from the communication section 5 to the target transmission destination. Similarly, the image data are also transmitted by the communication section 5 to the external information processing apparatus 30 and the facsimile device 31 from the network through the Internet. Further, in the facsimile mode, the apparatus control section 9 also transmits the image data from the FAX modem 7 to the facsimile device 6 through the telephone line by a similar operation.

When the processing of the image inputted from the image input section is completed as described above, the erasing section 32 erases the image data stored in the hard disk device 4.

Further, when there is an instruction for encryption, the apparatus control section 9 controls the encrypting/decrypting section 25 to encrypt the image data subjected to image processing by an encryption key. This encrypting processing is arithmetically performed by a known algorithm such as AES (Advanced Encryption Standard). The encrypted image data are stored in the hard disk device 4 and the memory 20.

Further, the apparatus control section 9 is provided with a variable section which, when synthesizing the inputted image data with specific information, varies the number of pieces of the specific information according to the size of a specific information imparting region to which the specific information is imparted.

The specific information imparting region is defined according to the size of a recording medium. Alternatively, when the specific information imparting region is designated as a part of the recording medium such as a paper sheet, the part of the recording medium is defined as the specific information imparting region. The command for defining the specific information imparting region is issued on the basis of the size information of the recording medium, such as a paper sheet, which is subjected to the print processing. The specific information constitutes a specific pattern in which specific characters, symbols, figures and the like are arranged in a linear or curved shape.

The apparatus control section 9 includes an imparting region designating section which designates the size of a specific information imparting region, and a variable section which varies the number of pieces of specific information according to the size of the imparting region designated by the imparting region designating section. The specific information imparting region is defined according to the size of the recording medium 43.

FIG. 4 is a figure showing a relation between the paper sheet size and the number of pieces of specific information, and FIG. 5 is a figure showing a relation between the paper sheet area and the number of pieces of specific information. In the apparatus control section 9, as shown in FIG. 4, the number of pieces of specific information is set according to the size of paper sheet. The number of pieces of specific information is made variable according to the area of paper sheet. For example, as shown in FIG. 4, when the paper sheet area is less than 6000 $mm^2$, the number of pieces of specific information is set to N1. When the paper sheet area is not less than 6000 and is less than 16000 $mm^2$, the number is set to N2. When the paper sheet area is not less than 16000 and is less than 66000 $mm^2$, the number is set to N3. When the paper sheet area is not less than 66000 $mm^2$, the number is set to N4 (where N is an integer and a relation: N4>N3>N2>N1 is assumed).

In the case where the paper sheet area is not less than 66000 $mm^2$, when the number of pieces of specific information is set high, the number of pieces of specific information may be increased so as to cause a sense of incongruity in a printed image. Therefore, when the size of paper sheet is not smaller than a predetermined size (for example, 66000 $mm^2$), the number of pieces of specific information is made to remain unchanged. The number of pieces of specific information is made to remain unchanged for a paper sheet of A1 size to A3 size and a paper sheet of B1 size to B4 size in FIG. 4.

On the contrary, in the case of the size of a name card, as shown in FIGS. 3(C) and 3(D), the specific information 44a is arranged in a manner of striding over the section line 45, so that the number of pieces of the specific information 44 included in the size of the name card is decreased. Therefore, when the size of the paper sheet is smaller than a predetermined size, the arrangement density is made high so as to increase the number of pieces N1 of the specific information. For example, in the case where the paper sheet area is less than 6000 mm$^2$ as shown in FIG. 5, the arrangement density is set higher as compared with the case where the paper sheet area is not less than 6000 mm$^2$.

Further, the operation control section 9 may also be provided with an adjusting section which adjusts a security level by varying the number of pieces of the specific information per unit area. Thus, the security level can be adjusted by varying the number of pieces of the specific information and setting an individual number of pieces of the specific information.

Figure 7A:
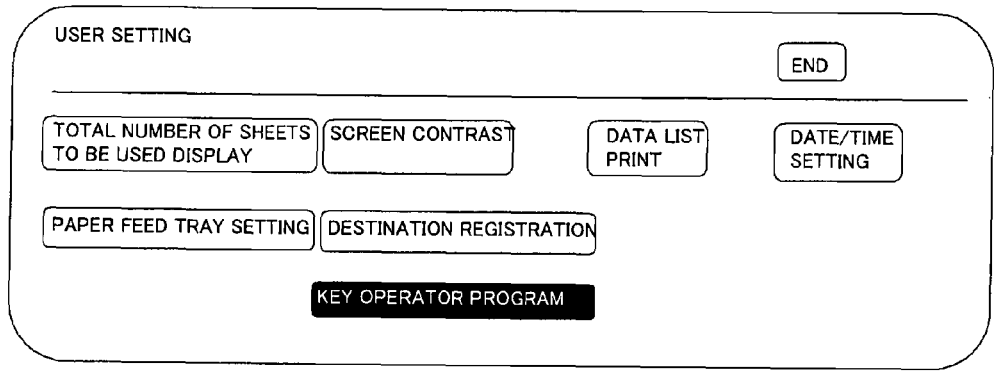
FIGS. 7(A), 7(B) and 7(C) are figures showing a user setting screen.
Figure 7B:
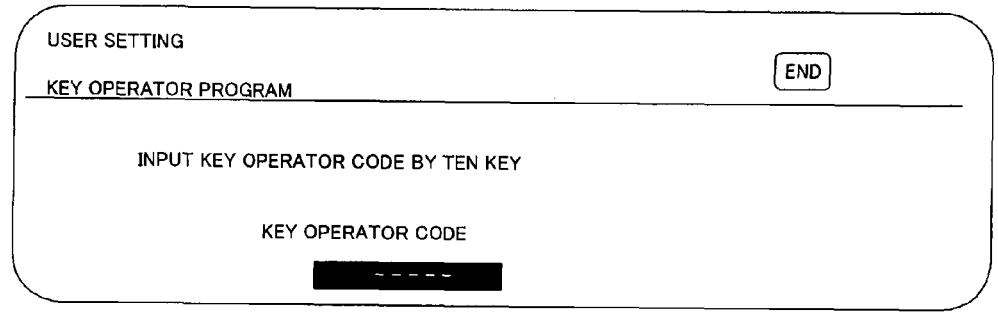
Figure 7C:
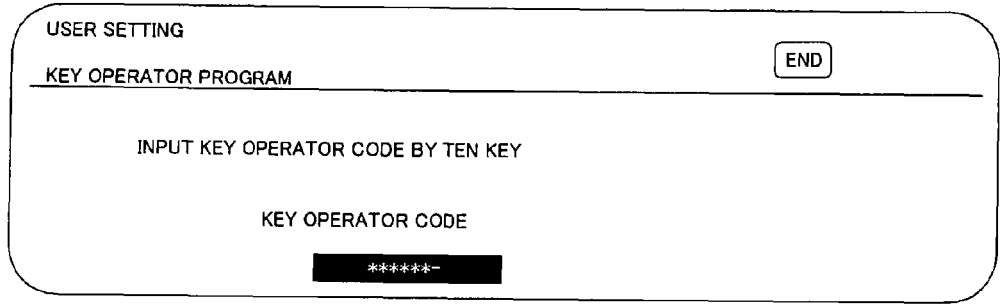
Figure 8:
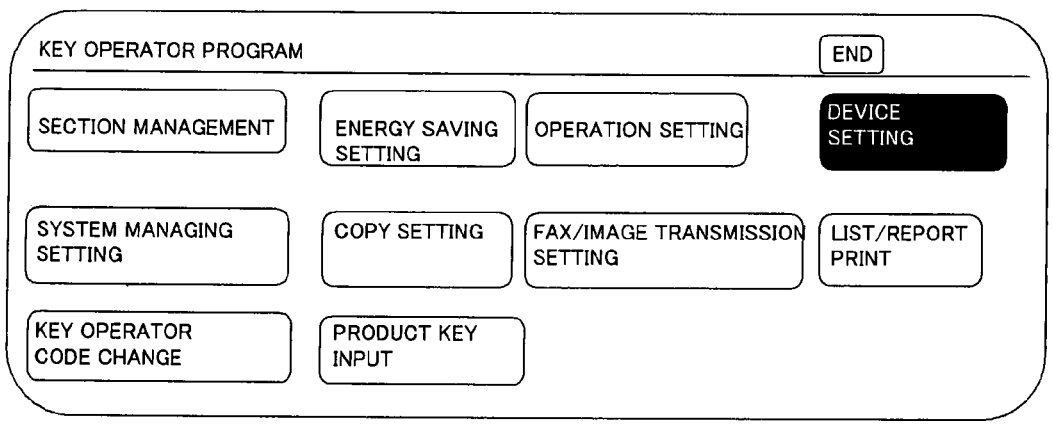
FIG. 8 is a figure showing a key operator program screen.

FIGS. 6 to 10 show procedure for adjusting the security level. When the user operates "user setting" on a screen of the operation panel, the user setting screen shown in FIG. 7 is displayed. When "key operator program" is operated on the user setting screen, a key operator code input screen shown in FIG. 7(B) is displayed to urge an input of a key operator code by a ten key. When a key operator code is inputted with the ten key according to the instruction as shown in FIG. 7(C), the key operator program screen shown in FIG. 8 is displayed.

Figure 9:
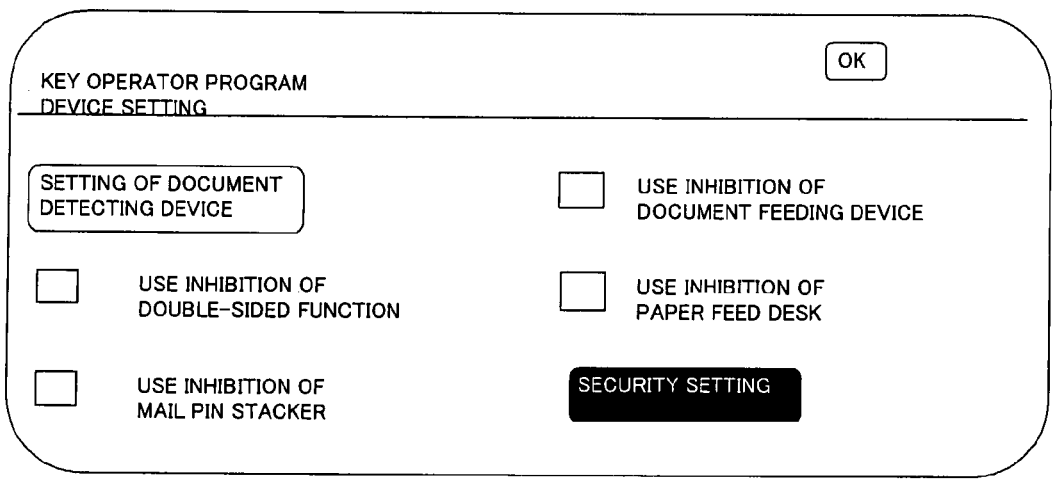
FIG. 9 is a figure showing a device setting screen.

When "device setting" is selected from the operation screen in FIG. 8, the device setting screen shown in FIG. 9 is displayed. Thus, when "security setting" is selected from the setting screen, the document control screen shown in FIG. 10 is displayed.

Figure 10:
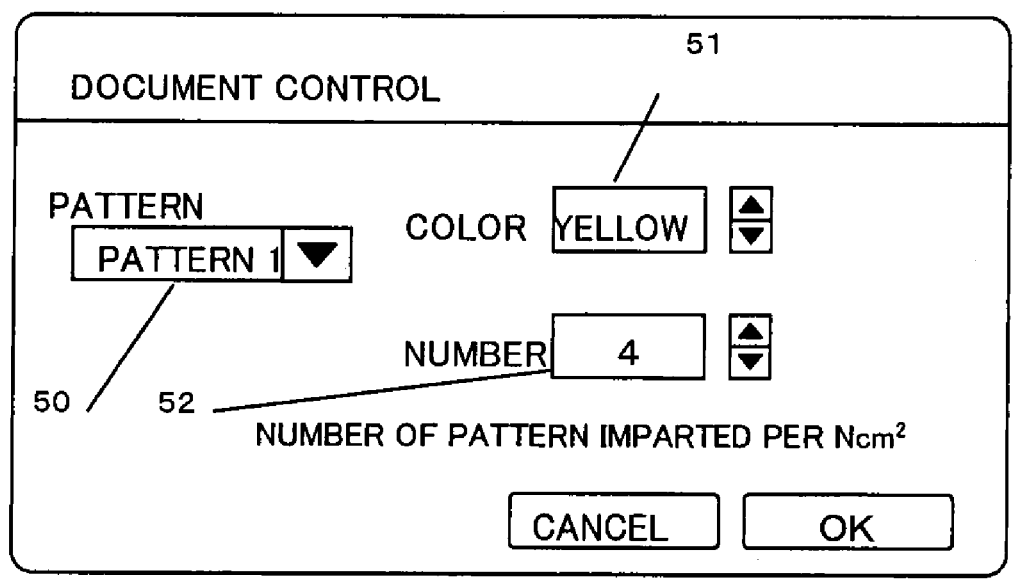
FIG. 10 is a figure showing a document control screen.

In the document control screen shown in FIG. 10, an arrangement pattern display screen 50 of specific information, a color selection screen 51 of specific information, and a number selection screen 52 for enabling the number of pieces of specific information per unit area to be selected are displayed. According to these screen displays, the security level can be adjusted by selecting the arrangement pattern, color and number of pieces of specific information. For example, if the case where there are four pieces of specific information per unit area of N cm$^2$ is set as "intermediate level", the case where there are five to seven pieces of specific information per the unit area is set as "high level", and the case where there are two to three pieces of specific information per the unit area is set as "low level".

It is needless to say that each of these selectable numbers enables the specific information to be surely detected in the specific information imparting region. Further, when the size of a selected recording medium is large, a maximum number which does not provide a sense of incongruity is set, and the selectable number can be set in the range which does not exceed the maximum number.

In this way, since the number of pieces of specific information is made variable according to the size of the specific information imparting region, when the specific information imparting region is small as in the case of a postcard, a name card and the like, the specific information is made to be surely detected by increasing the number of pieces of specific information. Further, when the specific information imparting region is large, the number of pieces of specific information is suppressed to prevent a sense of incongruity from being provided to the document.

Further, the apparatus control section 9 is provided with a specific information detecting section which detects the specific information 44 existing in the inputted image data, and is constituted so as to perform the processing included in the specific information 44 on the basis of the detection result. Since the specific information constitutes a specific pattern in which specific characters, symbols, figures and the like are arranged in a linear or curved shape, as described above, the apparatus control section 9 recognizes the specific information by detecting the specific pattern from the inputted image data.

Figure 11:
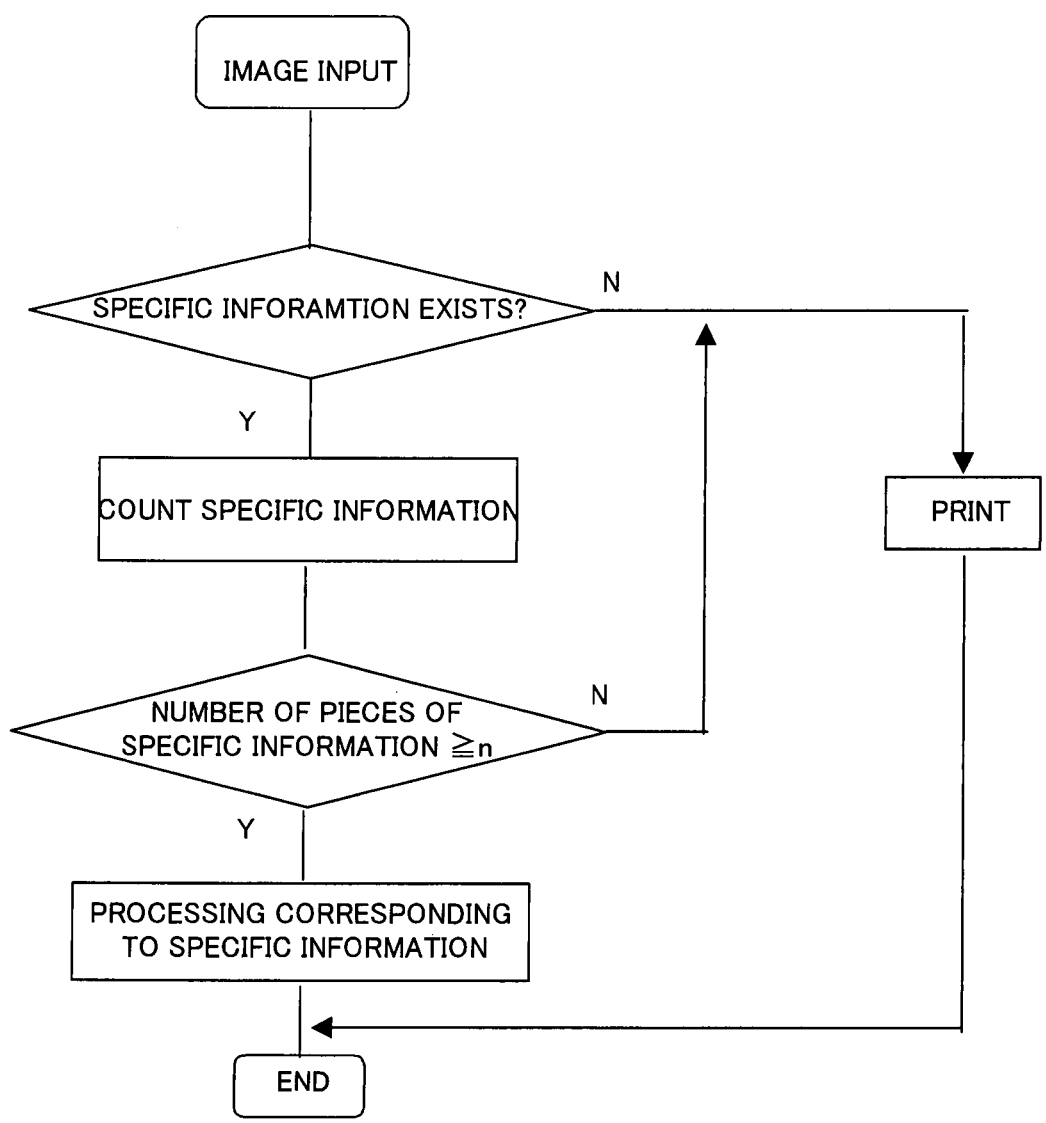
FIG. 11 is a flow chart showing image processing control at the time of reading the specific information.

That is, as shown in FIG. 11, when the specific information 44 is inputted together with the image data, the apparatus control section 9 detects the specific information 44 and counts the number of pieces of the specific information. When the counted number is not smaller than n, the apparatus control section 9 performs the processing according to the specific information. For example, when the specific information is the copy inhibition processing, the apparatus control section 9 performs the processing to inhibit the printing. When the counted number of the specific information does not reach n, or when no specific information exists, the apparatus control section 9 performs the processing of printing and the like as it is.

In this case, in the apparatus control section 9, the threshold value N for determining whether or not the specific information is adopted, on the basis of the detected number of pieces of the inputted specific information 44, is varied according to the size of the specific information reading range. That is, the apparatus control section 9 is provided with a reading range recognizing section which recognizes the size of the specific information reading range, and a threshold value variable section which varies the threshold value of the number of pieces of specific information according to the size recognized by the reading range recognizing section.

The specific information reading range is defined according to the size of the recording medium 43, or on the basis of shade information 42 extracted from the inputted image information.

Figure 12:
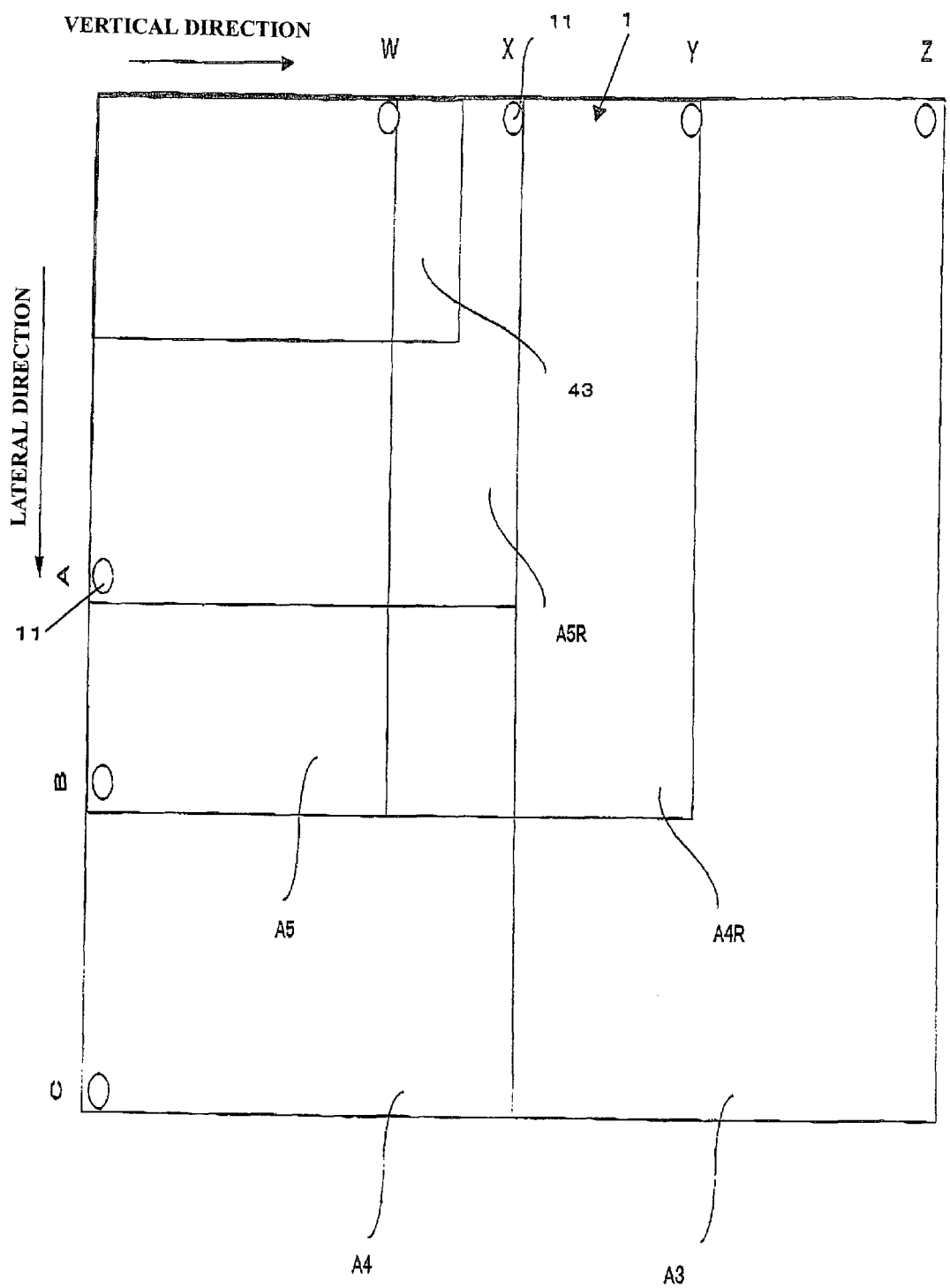
FIG. 12 is a figure showing a method for detecting the size of a document by using a document detecting sensor.

The size of the recording medium 43 is detected from an inputted document size. The document size is detected on the basis of outputs from a plurality of document size detecting sensors 11 provided in the image reading section 1, as shown in FIG. 12. The document detecting sensors 11 are arranged at positions W, X, Y, Z on the vertical side and positions A, B, C on the lateral side at the periphery of the image reading section 1, respectively. When a document of fixed size is detected and there are sensor inputs as shown in the table in FIG. 13, the document is recognized as a paper sheet having a size shown in the left column in the table.

However, when the document 43 placed on the reading section 1 has a unfixed size, for example, in the case of the document 43 shown in FIG. 12, only the document size detecting sensor 11 denoted by "W" is turned on. In this case, in the reading range recognizing section, the size in the lateral direction is recognized to be not larger than "A5R", and the size in the vertical direction is recognized to be not smaller than "A5" and not larger than "A5R", so that the reading area of the document is identified as "A5R". In this way, when a document of unfixed size is detected, it is possible to select a document of a size larger by one rank than the size information obtained from the document size detecting sensor 11, and to set the selected size of the document as the specific information reading range of the document of unfixed size.

In the apparatus control section 9, a specific information number threshold value is set according to the size of paper sheet. The threshold value is made variable according to the area of paper sheet. The examples are explained by using FIGS. 4 and 5. However, "number of pieces of specific information" shown in FIGS. 4 and 5 is read as "specific information number threshold value". As shown in FIG. 5, when the paper sheet area is less than 6000 mm$^2$, the threshold value is set to N1. When the paper sheet area is not less than 6000 mm$^2$ and is less than 16000 mm², the threshold value is set to N2. When the paper sheet area is not less than 16000 mm² and is less than 66000 mm², the threshold value is set to N3. When the paper sheet area is not less than 66000 mm², the threshold value is set to N4 (where N is an integer and a relation: N4>N3>N2>N1 is assumed).

In the case where the size is not smaller than 66000 mm², the threshold value which is set high may increase the number of pieces of specific information so as to provide a sense of incongruity to a printed image. Therefore, the threshold value is made to remain unchanged in the case where the size is not smaller than a predetermined size (for example, 66000 mm²). The threshold value is made to remain unchanged for a size from the A1 size to A3 size and a size from B1 size to B4 size in FIG. 4.

Figure 3:
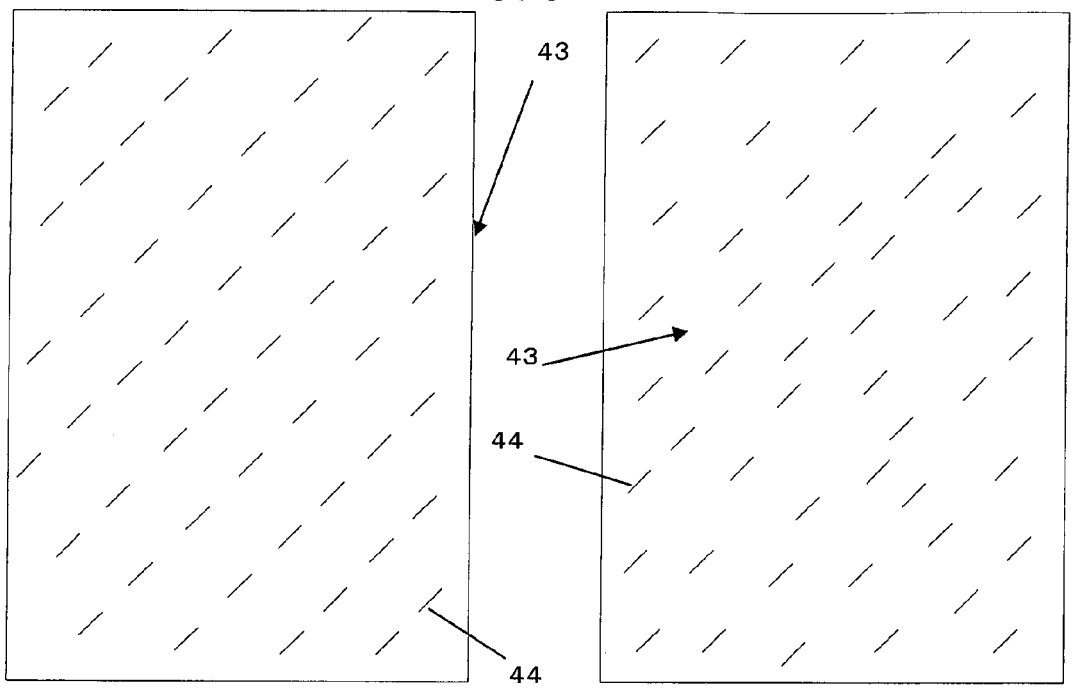
FIGS. 3(A) to 3(D) are figures showing examples in which specific information is imparted to separable recording papers.
Figure 3:
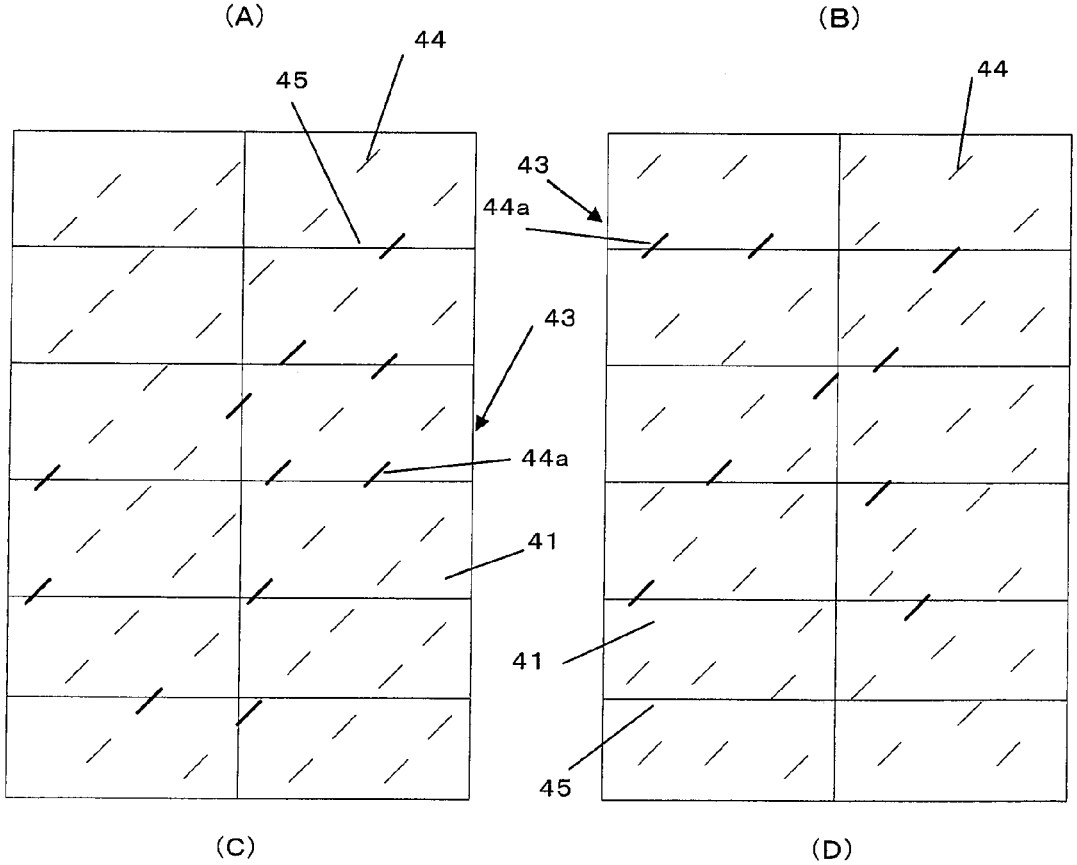
Figure 6:
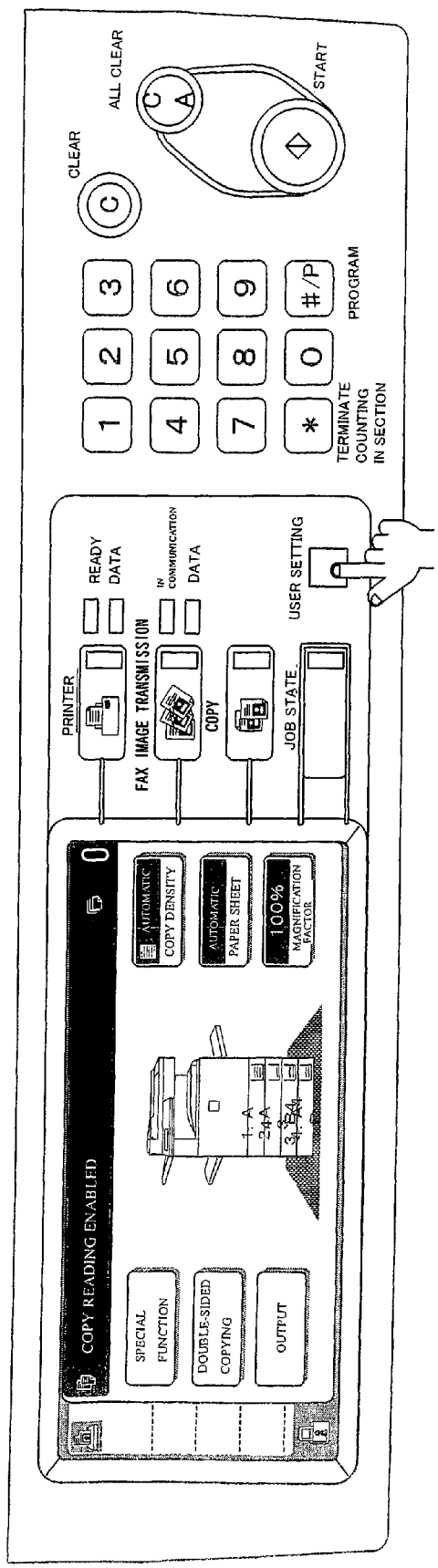
FIG. 6 is a figure showing an operation screen for adjusting a security level.

On the contrary, in the case of the name card size, as shown in FIGS. 3 (C) and 3(D), the specific information 44a is arranged in a manner of striding over the section line 45, so that the number of pieces of the specific information 44 included in the name card size is reduced. Therefore, the threshold value N1 is set so as to be lowered.

Figure 14:
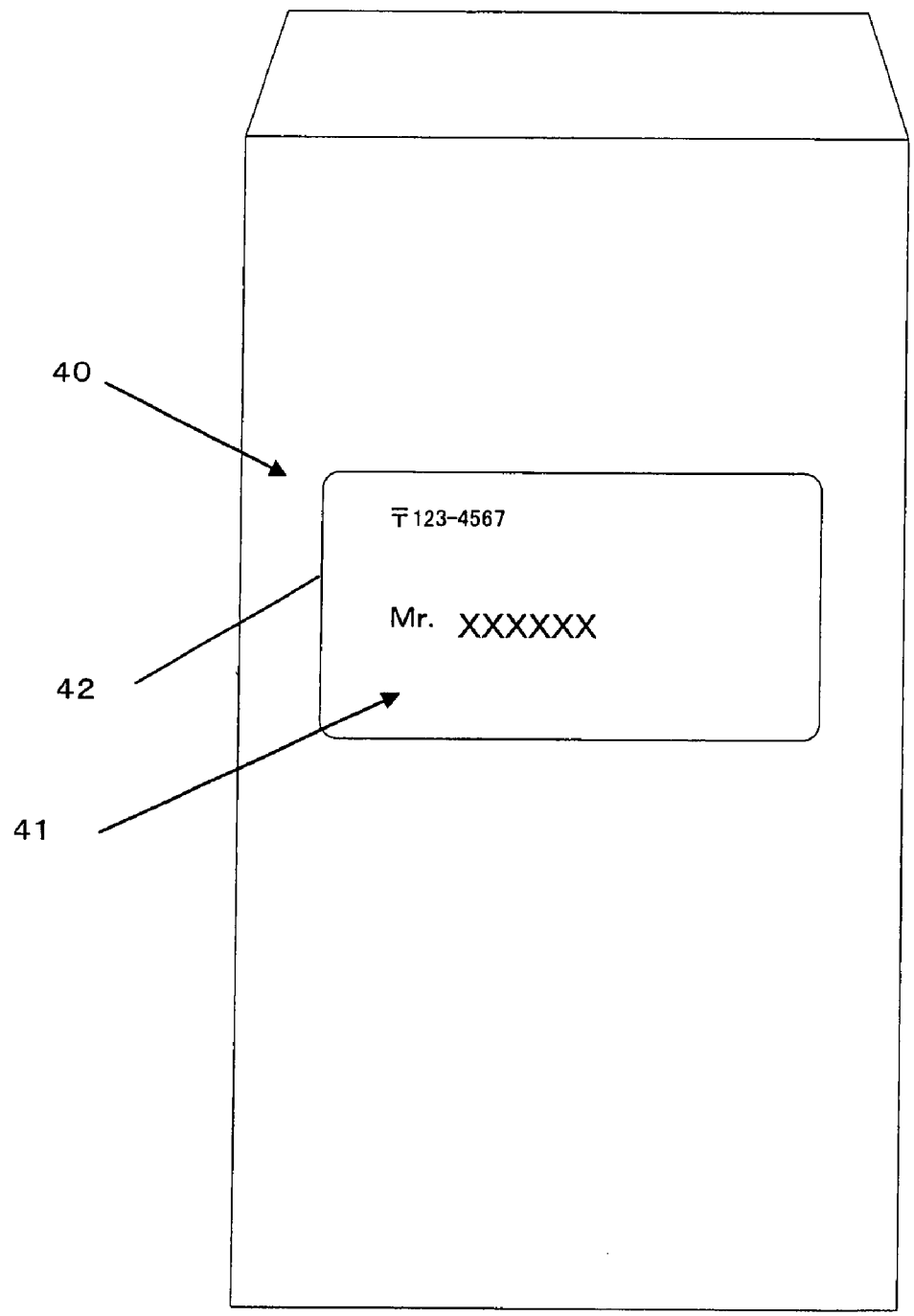
FIG. 14 is a figure showing an example when the document is an envelope to which an address label paper is stuck.

Further, in the reading range recognizing section, when a label paper 41 is stuck on an envelope 40 as shown in FIG. 14, a dark shadow 42 is generated at the boundary between the label paper 41 and the envelope 40 due to the thickness of the label paper 41 at the time of image reading. Normally, when the envelope 40 is recognized as the document size, since the specific information exists only in the range of the label paper, the number of pieces of specific information may be deficient regardless of the document size, as a result of which the processing which does not recognize the specific information may be performed.

In order to avoid this, the reading range recognizing section of the apparatus control section 9 is set so as to recognize not only the document size information but also the shade information of the label paper 41.

Figure 15:
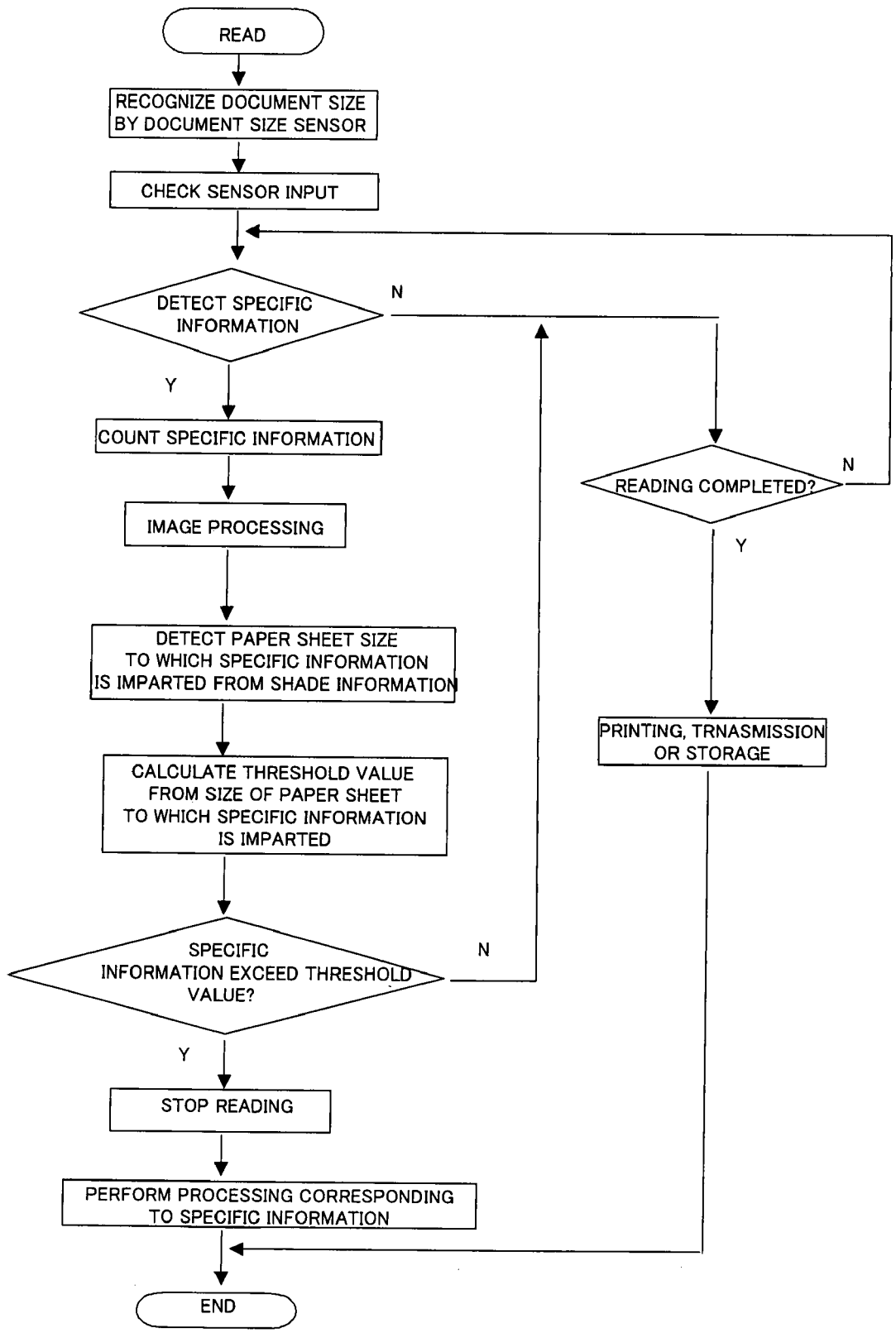

FIG. 15 shows a flow chart of such control. As shown in the figure, the size of a document is read by the document size detecting sensor 11 in the image reading section 1. At this time, the sensor input is checked to judge whether or not the specific information was detected. When the specific information exists, the number of pieces of the specific information is counted, and the image processing is performed in the image processing section. Then, the presence of the shade information is detected, and when specific shade information, for example, rectangular shade information formed by the label paper and the like exists, a reading range of specific information is specified from this shade information.

The size, for example, the area is calculated from the specified reading range, and on the basis of the area, the specific information number threshold value corresponding to the paper sheet size is calculated from the table (see FIG. 5 incorporated herein). Then, whether or not the number of pieces of the specific information is not smaller than the threshold value is judged. When the number of pieces of the specific information is not smaller than the threshold value, the reading is stopped, and the processing corresponding to the specific information is performed. For example, the print processing is stopped.

When the number of pieces of the specific information is smaller than the threshold value, or when the specific information is not detected, the above described processing is repeated until the reading is completed. When the reading is completed, the processing such as printing, transmission and storage is performed.

In this way, since the threshold value is changed according to the size of the specific information reading range, even when the size of the specific information reading range is small and thereby the number of pieces of specific information is small, the detection number is made to exceed the threshold value by setting the threshold value to a low value, thereby enabling the specific information to be recognized. As a result, the processing according to the specific information, such as copy inhibition, can be correctly performed.

It is to be understood that the present invention is not limited to the above described embodiment, but numerous modifications and changes can be obviously made therein without departing from the spirit and scope of the present invention. The image processing apparatus may be a composite machine having a copy mode and a facsimile mode, and may also be a dedicated machine having only a single mode, such as a copy machine and a facsimile device.

What is claimed is:

1. An image processing apparatus forming an image of image data on a recording medium comprising:
a variable section for, when synthesizing the image data with specific information including an image different from the image data, varying the number of pieces of the specific information according to a size of a specific information imparting region to which the specific information is imparted,
wherein the variable section, when the size of the specific information imparting region is smaller than a predetermined size, varies the number of pieces of the specific information according to the size of the specific information imparting region; and when the size of the specific information imparting region is not smaller than the predetermined size, makes the number of pieces of the specific information remain unchanged.

2. The image processing apparatus according to claim 1, further comprising defining the specific information imparting region according to a size of the recording medium.

3. The image processing apparatus according to claim 1 or claim 2, further comprising increasing or decreasing the number of pieces of the specific information by changing arrangement density of the specific information.

4. The image processing apparatus according to claim 1 or claim 2, further comprising adjusting a security level by varying the number of pieces of the specific information per unit area.

5. An image processing apparatus comprising:
a threshold value variable section for, when processing image data together with specific information including an image different from the image data, varying a specific information number threshold value for determining whether or not the specific information is adopted, according to a size of a specific information reading range,
wherein the threshold value variable section, when the size of the specific information reading range is smaller than a predetermined size, varies the threshold value according to the size of the specific information reading range; and when the size of the specific information reading range is not smaller than the predetermined size, makes the threshold value remain unchanged.

6. The image processing apparatus according to claim 5, further comprising defining the specific information reading range according to a size of a recording medium.

7. The image processing apparatus according to claim 5 or 6, comprising defining the specific information reading range on the basis of shade information extracted from information of the image.

8. The image processing apparatus according to claim 5, wherein the image data and the specific information are information read by a scanner device.

* * * * *